United States Patent [19]

Morel et al.

[11] 4,387,268
[45] Jun. 7, 1983

[54] SLEEVE FOR PROTECTING SPLICES IN ELECTRIC OR TELEPHONE CABLES

[75] Inventors: Andre Morel; Jacques Morel, both of Chateauneuf-en-Thymerais, France

[73] Assignee: Etablissements Morel, Ateliers Electromecaniques de Favieres, Chateauneuf-en-Thymerais, France

[21] Appl. No.: 279,997
[22] PCT Filed: Nov. 7, 1980
[86] PCT No.: PCT/FR80/00160
  § 371 Date: Jul. 7, 1981
  § 102(e) Date: Jul. 7, 1981
[87] PCT Pub. No.: WO81/01487
  PCT Pub. Date: May 28, 1981

[30] Foreign Application Priority Data
Nov. 15, 1979 [FR] France .................. 7928178
Mar. 26, 1980 [FR] France .................. 8006660

[51] Int. Cl.³ .................. H02G 15/18; H02G 15/113
[52] U.S. Cl. .................. 174/92; 174/77 R
[58] Field of Search .................. 174/91, 92, 93, 77 R, 174/76

[56] References Cited

U.S. PATENT DOCUMENTS 2,771,502 11/1956 King .
2,788,385 4/1957 Doering .
3,715,459 2/1973 Hoffman .
3,775,204 11/1973 Thompson et al. .............. 174/92 X
3,848,074 11/1974 Channell .
3,861,422 1/1975 Christie .................. 174/92 X
3,992,569 11/1976 Hankins et al. .................. 174/92

FOREIGN PATENT DOCUMENTS 679654 7/1939 Fed. Rep. of Germany .
1813201 7/1970 Fed. Rep. of Germany .
2020637 11/1971 Fed. Rep. of Germany .
2063097 5/1972 Fed. Rep. of Germany .
7739190 4/1978 Fed. Rep. of Germany .
2652803 6/1978 Fed. Rep. of Germany .
2080335 11/1971 France .
2090148 1/1972 France .
2301119 9/1976 France .
  28094 of 1913 United Kingdom .
913727 12/1962 United Kingdom .

Primary Examiner—Laramie E. Askin
Assistant Examiner—D. A. Tone
Attorney, Agent, or Firm—Young & Thompson

[57] ABSTRACT

The sleeve for protecting the splice (4) in telephone cables (2) and (3) is made up of two half-shells (1a, 1b) joined together by their adjacent edges, around splice (4). These adjacent edges are provided with a groove which, in the position where the shells are joined together, defines a duct, devices being provided for injecting into this duct a pasty material creating watertightness between these adjacent edges. The opposite ends (9, 20) of the sleeve are provided with jaws (11, 12, 13) for securing axially the ends of the cables (2, 3) to the sleeve and with devices for creating watertightness between these cables and these ends (9,10) of the sleeve.

Each of the ends (9,10) of the sleeve bears at least two detachable jaws (11, 12) defining between them a chamber (18) connected with the above-mentioned duct.

19 Claims, 18 Drawing Figures

FIG_13  FIG_14

FIG_15  FIG_16

FIG_18  FIG_17

SLEEVE FOR PROTECTING SPLICES IN ELECTRIC OR TELEPHONE CABLES

The present invention concerns a sleeve to protect the splice in electric or telephone cables.

In French Patent application Ser. No. 79 12 989 lodged on May 22, 1979 on behalf of the Applicant, a sleeve of this type was described. This sleeve is made up of two half-shells joined together at their adjacent edges by means of a clamping screw, and enclosing the splice made between two cables, in particular telephone cables. The adjacent edges of these half-shells are provided with a groove defining a duct when these half-shells are joined together, devices being provided for injecting a pasty material into this duct, making it possible to secure watertightness between the joined edges of the two half-shells. This pasty material thus prevents dampness from penetrating inside the sleeve. This pasty material can for example be an electrically insulating grease.

The opposite ends of this sleeve are provided with jaws to fasten the ends of the cables axially in the sleeve. These jaws are made up of two jaw elements tightened onto one another around the cable by means of the clamping screw. On the other hand, the joined ends of the two half-shells define a ring-shaped chamber surrounding the cable, which connects with the duct arranged between the joined edges of the half-shells. Thus the grease injected into this duct penetrates into the above-mentioned ring-shaped chamber, which makes it possible for watertightness between the cables and the opposite ends of the sleeve to be secured.

The advantages of such a sleeve lie in the fact that it can be made watertight with a relatively small amount of grease or similar pasty material. Also, the use of a grease for creating this water-tightness makes it possible to dismantle the sleeve easily, without there being any need to destroy it, so that it can be used again after dismantling.

The aim of the present invention is to create a protective sleeve for splicing electric cables, in particular telephone cables, in which watertightness and ease of assembly around the cables are substantially improved in relation to the above-mentioned sleeve.

According to the invention, this sleeve is characterised by the fact that its ends are provided with at least two detachable jaws defining between them a chamber connected with the duct for introduction of the pasty material.

In the position in which the sleeve is assembled around the cables, these two jaws bear on these cables while defining a chamber which is substantially closed. When the pasty material is injected the latter fills this chamber thus securing the watertightness required between the sleeve and the cables. Simultaneously these jaws secure the cables axially to the opposite ends of the sleeve.

Assembling such a sleeve around the splice made between the cables is particularly easy and excellent watertightness is obtained.

According to an advantageous version of the invention, the two half-shells of the sleeve are joined onto one another by means of a clamping screw and the two jaws are of such measurements as to be able to bear on the corresponding cable, when the screws connecting the two half-shells are tightened.

This arrangement makes it possible to do without any separate ancillary tightening device for the jaws, which considerably simplifies assembly of the sleeve around the cables.

According to a preferred version of the invention, an elastomer-based adhesive band is rolled around the ends of the cables, the above-mentioned two jaws being designed to rest on this adhesive band, when the half-shells are joined onto one another.

This extra thick adhesive band on the cables makes it possible to make a watertight joint between the cables and the jaws. The chamber defined between the two jaws in a clamped position on the cable is, owing to this, substantially watertight due to the above-mentioned watertight joint, which makes it possible for the pasty material to be injected under relatively high pressure, which contributes to obtaining excellent watertightness.

Preferably the jaws are secured in a detachable manner and are held in position axially in seatings provided on the inner surface of the ends of the sleeve.

Due to the fact that the jaws are secured in this detachable manner, a jaw of one size can act as protection for cables of different diameters by choosing, from among a set of jaws of different sizes, jaws which fit the cable to be protected.

Other characteristics and advantages of the invention will appear again in the following description.

In the attached drawings, given as non-limiting examples:

FIG. 17 is a plan view of a vice component suitable for allowing two cables to pass through;

Figure 1:
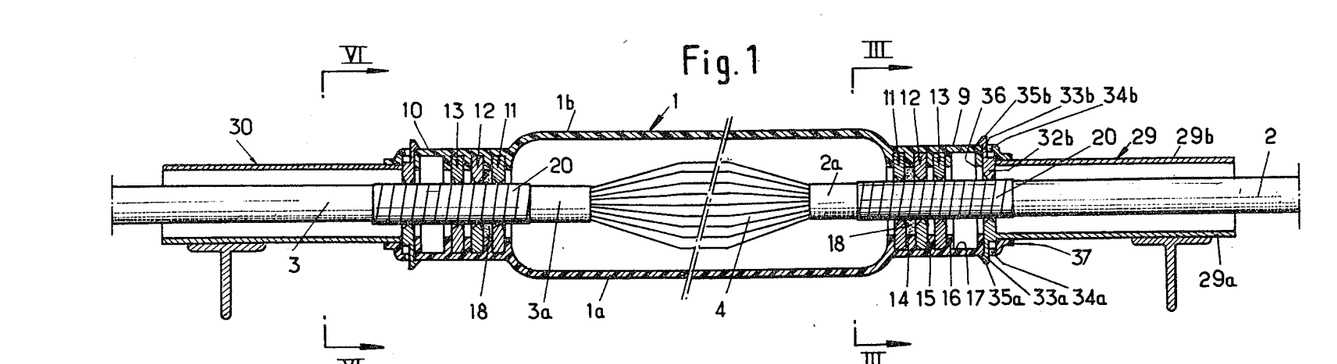
FIG. 1 is a view in longitudinal section with part cut away of a sleeve according to the invention surrounding the splice connecting two cables.

In the embodiment of FIG. 1, sleeve 1 which is generally cylindrical in shape, axially surrounds two telephone cables 2, 3 connected by a splice 4. This sleeve 1 is of a plastic material such as polyamide, polyester or a copolymer of acrylonitrilie, butadiene and styrene.

Figure 3:
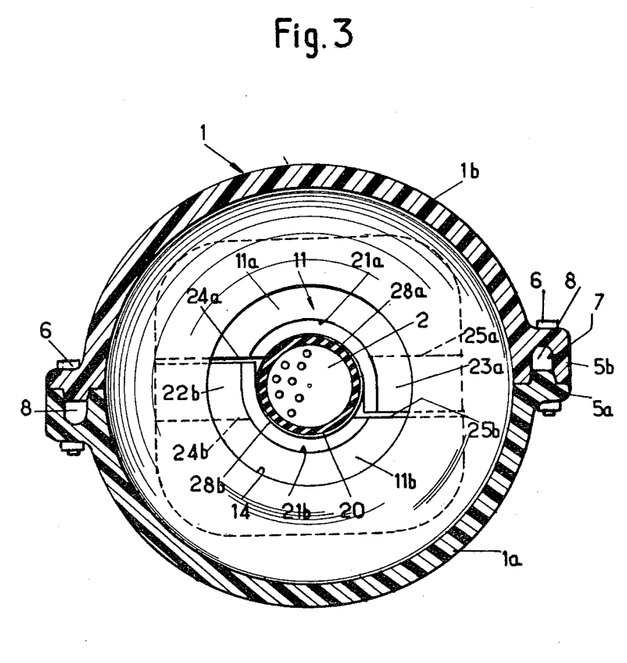
FIG. 3 is a view in cross-section along the plane III—III of FIG. 1.

Sleeve 1 is formed by two half-shells 1a, 1b joined together at their adjacent edges 5a, 5b (see FIG. 3) by means of tightening screws 6. Edge 5b of half-shell 1b is provided with a groove 7 which in the position of assembly with half-shell 1a, defines a duct 8 extending along the perimeter defined by the junction plane of the two half-shells 1a, 1b.

The opposite end portions 9,10 of sleeve 1 are provided with jaws 11, 12 and 13 which clamp cables 2, 3 and which thus secure the latter axially in sleeve 1. This clamping is obtained when half-shells 1a, 1b are joined to each other by means of connecting screws 6.

In the embodiment shown, jaws 11, 12 and 13 are secured in a detachable manner and held in position axially in seatings 14, 15 and 16 provided on the inner surface 17 of end portions 9 and 10 of sleeve 1. These seatings 14, 15 and 16 have a U-shaped section fitting that of jaws 11, 12 and 13 and they extend all along the periphery of the inner surface 17 of end portions 9 and 10 of sleeve 1.

Figure 2:
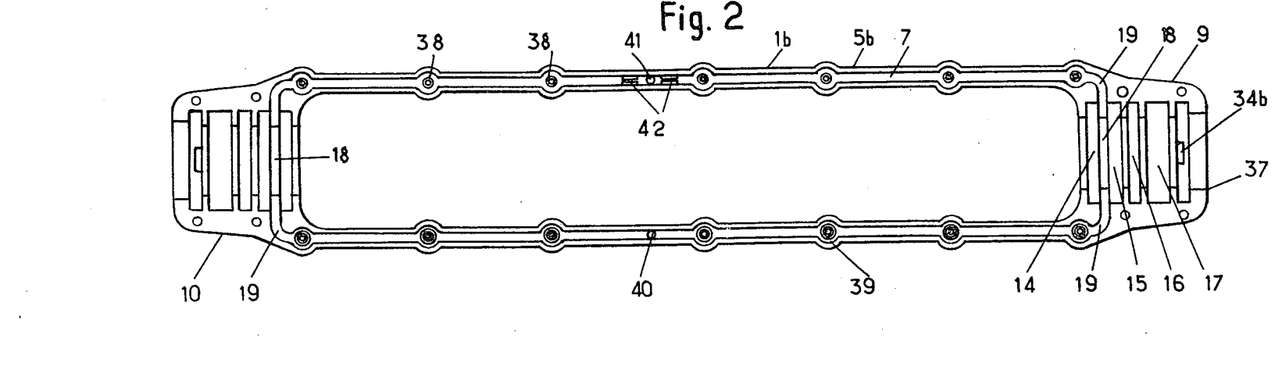
FIG. 2 is a plan view along the inner surface of one of the half-shells of the sleeve shown in FIG. 1.

The two jaws 11, 12 nearest splice 4 define between them a chamber 18 which is substantially closed, connected with groove 7 on half-shell 1b through channels 19 (see FIG. 2).

On the other hand it can be seen in FIG. 1 that an elastomer-based adhesive band 20 is rolled around ends 2a, 3a of telephone cables 2 and 3, jaws 11, 12 and 13 bearing on this band 20. This band 20 can be made for example of adhesive non-cured rubber which hardens, in other words, cures itself, in the open air.

Figure 4:
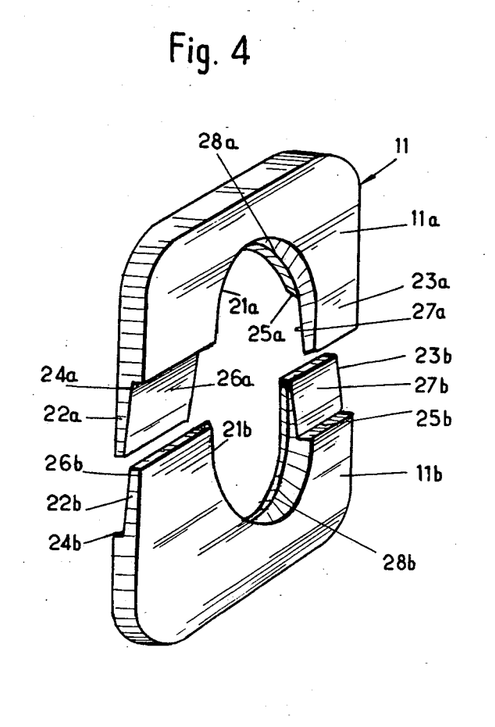
FIG. 4 is a perspective view blown up and on an enlarged scale, of the two elements making up a jaw for the sleeve according to the invention.
Figure 5:
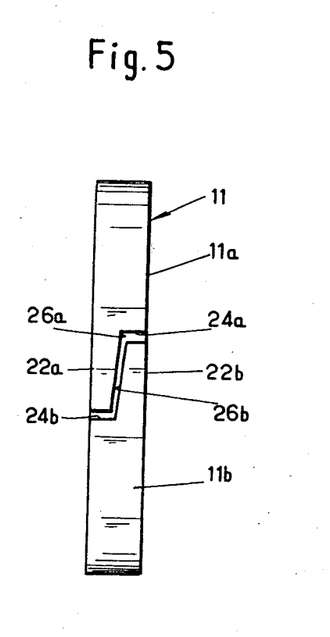
FIG. 5 is an outline view showing both elements of the jaw according to FIG. 5 in an assembled position.

In FIGS. 3 to 6, it can be seen that jaw 11 is made up of two jaw elements 11a, 11b, each of which is provided with a notch 21a (or 21b) which is substantially semi-circular, the radius of which fits that of cable 2 (or 3). Notches 21a and 21b are bordered respectively by two wings 22a, 23a and 22b, 23b. These wings 22a, 23a, and 22b, 23b are provided with stepped joint surfaces 24a, 25a, 24b, 25b. The latter permit interlocking of the above-mentioned wings in the extension of one another as shown in FIG. 5. Also, stepped joint surfaces 24a, 25a, 24b, 25b define mutual bearing surfaces 26a, 27a, 26b, 27b. Bearing surfaces 26a, 27a of jaw elements 11a and 26a, 27b of jaw element 11b are turned in opposite directions.

Also notches 21a, 21b of jaw elements 11a, 11b have a chamfered outline, the summit 28a (or 28b) of which is directed towards the centre of the corresponding notch 21a (or 21b).

The other jaws 12, 13 are identical to jaw 11 described above.

In the embodiment shown (see FIG. 1), the end portions 9,10 of sleeve 1 are extended by sheaths 29, 30 constructed of two identical parts 29a, 29b (see FIG. 6) which are substantially joined along two diametrical generators 31a, 31b. The end of each sheath 29, 30 adjoining end portions 9,10 of sleeve 1 bears a jaw made up of two jaw elements 32a, 32b similar to jaw elements 11a, 11b. These two jaw elements 32a, 32b are made integral with the corresponding parts 29a, 29b of sheath 29 (or 30).

Figure 6:
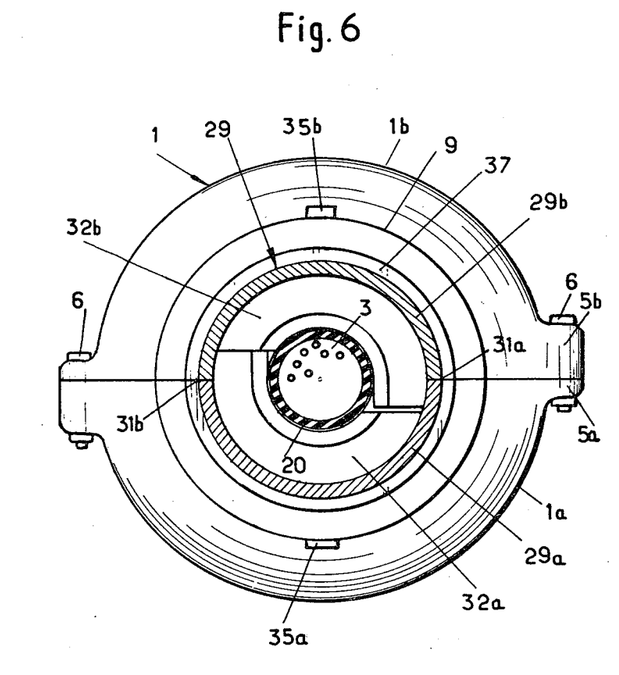
FIG. 6 is a view in cross-section along plane VI—VI of FIG. 1.

In the assembled position of sleeve 1, as shown in FIGS. 1 and 6, the two jaw elements 32a, 32b bear on adhesive band 20 rolled around adjoining cable 2 or 3.

Each part 29a, 29b of sheath 20 (see FIGS. 1 and 6) is provided with elastic tabs 33a, 33b in extension of jaw elements 32a, 32b and projecting outwards. These tabs are inserted into diametrical apertures 34a, 34b of the corresponding end portion 9 of sleeve 1. These elastic tabs 33a, 33b bear locking noses 35a, 35b permitting these tabs to be interlocked with the corresponding apertures 34a, 34b.

In a locked position, jaw elements 32a and 32b bear against a radial partition 36 provided inside the end portion 9 (or 10) of sleeve 1. On the other hand, each of parts 29a, 29b of sheath 29 (or 30) is jammed radially against a ring-shaped shoulder 37 of end portion 9 (or 10) of sleeve 1.

Also, the sleeve 1 according to the invention has the characteristic (see FIG. 2) that the holes 38 for receiving the screws 6 connecting half-shells 1a, 1b open into the groove 7 provided on the edge 5b of half-shell 1b. Also, this groove 7 has enlarged circles 39 at the level of these holes 38, so that the dampproof pasty material which is injected into groove 7 can pass through on either side of connecting screws 6 inserted into holes 38.

This grease or other similar pasty material is injected through an injection aperture 40 (see FIG. 2) which opens into groove 7. Air is extracted from the duct defined by this groove 7 through a vent 41 which connects with groove 7 opposite injection aperture 40. This vent 41 is located between two narrow parts 42 of groove 7, the role of which will be explained when use of the sleeve according to the invention is described.

Sleeve 1 is placed in position as follows, around splice 4 which connects telephone cables 2 and 3.

In seatings 14, 15 and 16 provided in the end portions of half-shells 1a and 1b there are fitted jaw elements 11a, 11b and those corresponding to jaws 12 and 13. By means of elastic tabs 33a and 33b, parts 29a, 29b of sheaths 29 (and 30) are fixed by ratchet-type engagement onto the corresponding half shells 1a and 1b.

An adhesive band 20, which is, for example, made of self-curing rubber, is rolled around ends 2a and 3a of cables 2 and 3, until an extra thickness of the order of 1 mm is obtained.

Half-shells 1a and 1b are assembled onto one another and are fastened together with the aid of clamping screws 6.

In view of the fact that the radius of the notches in the jaw elements corresponding to jaws 11, 12, 13 and 32a and 32b corresponds to that of cables 2 and 3, tightening of the connecting screws 6 has the effect of making the chamfered edge of these notches penetrate into the rubber band 20 to a depth equal to the extra thickness of this band 20.

Also, when connected, the components making up the jaws are interlocked with each other by their wings such as 22a, 23a, 22b and 23b. This interlocking makes it possible to create between the different jaws chambers which are substantially closed, and also to render solid the elements of each jaw, which makes it possible to obtain excellent axial fastening of the cables 2 and 3 to the end portions 9 and 10 of the sleeve 1.

It is then sufficient to inject into the injection aperture 40 of sleeve 1 a pasty material such as a self-curing silicone or polyurethane elastomer. This grease penetrates into groove 7 defined on the circumference of half-shells 1a and 1b and fills both chambers 18 provided between jaws 11 and 12 arranged in the opposite end portions 9 and 10 of sleeve 1. The air filling the duct 8 and the chambers 18 is extracted outwards through vent 41.

When the pasty material reaches each side of the narrow parts 42 of groove 7, its progress is checked, which brings about compression of this substance and rapid extraction of the remaining air.

This pressure makes it possible for excellent watertightness to be obtained at the same time at the level of edges 5a, 5b of the two half-shells 1a and 1b and at the level of jaws 11 and 12 for clamping the cables 2 and 3, in particular due to the chamfered edge of the notches of the latter being driven into adhesive band 20.

Also, in view of the fact that the pasty material injected into groove 7 passes around connecting screws 6, there is no risk that the material could escape at the level of these screws towards the inside or outside of sleeve 1.

The role of the jaws 13 and of the jaw elements 32a, 32b of the sheaths is mainly to improve axial fastening of cables 2 and 3 in relation to the axial stresses which could be applied to these cables. The jaws 13 and the jaw elements 32a, 32b however play a complementary waterproofing role by forming in the end portions 8 or 10 of the sleeve as many barriers capable of preventing dampness from penetrating inside sleeve 1.

The above-mentioned jaws have moreover the advantage of all being identical, so that they can be produced by moulding a plastics material with the aid of a single mould.

Also, they are very easily placed in position and secured into seatings 14, 15 and 16 since they do not require any tool or accessory anchoring instrument, such as a screw or the like.

Also, the sleeve according to the invention can be used for cables having different diameters. For this purpose, it is sufficient to provide a set of jaws which have notches with different radii fitting that of the various cables.

The invention can also apply to the production of sleeves to protect a splice connecting more than two electric or telephone cables.

Figure 7:
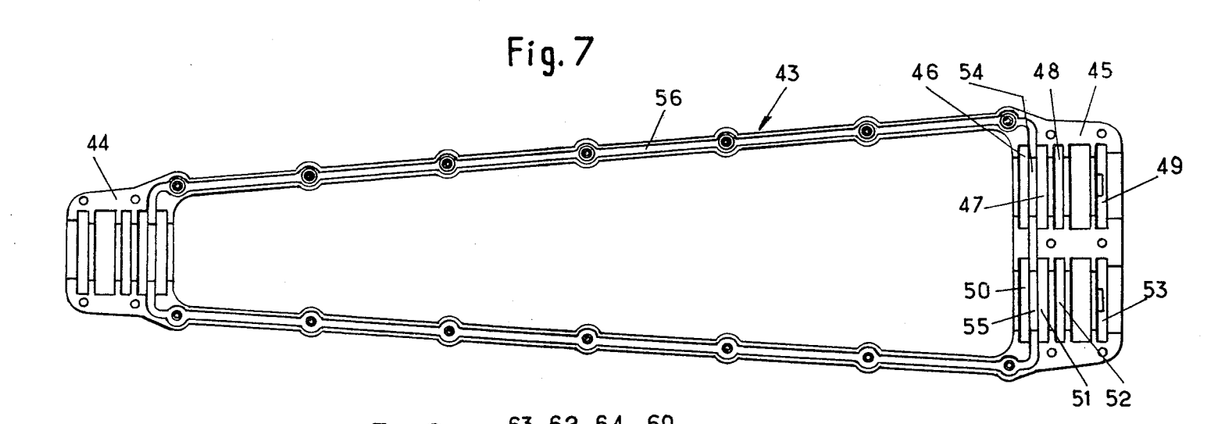
FIG. 7 is a similar view of FIG. 2, showing a variant of an embodiment of the sleeve according to the invention.

FIG. 7 shows as an example a half-shell 43 for a sleeve in the general shape of a truncated cone. The narrower end 44 serves to take a single cable through it, as in the case of the embodiment described with reference to FIGS. 1 to 6.

The other end 45 serves to take two parallel cables through it. This end 45 is provided with a first series of seatings 46, 47, 48, 49, receiving the jaw elements to clamp one of the cables and a second series of seatings 50, 51, 52, 53 to receive the jaw elements ensuring anchoring of the other cable. Between seatings 46, 47 and 50, 51 there is provided a chamber 54, 55, connecting with peripheral groove 56.

Figure 8:
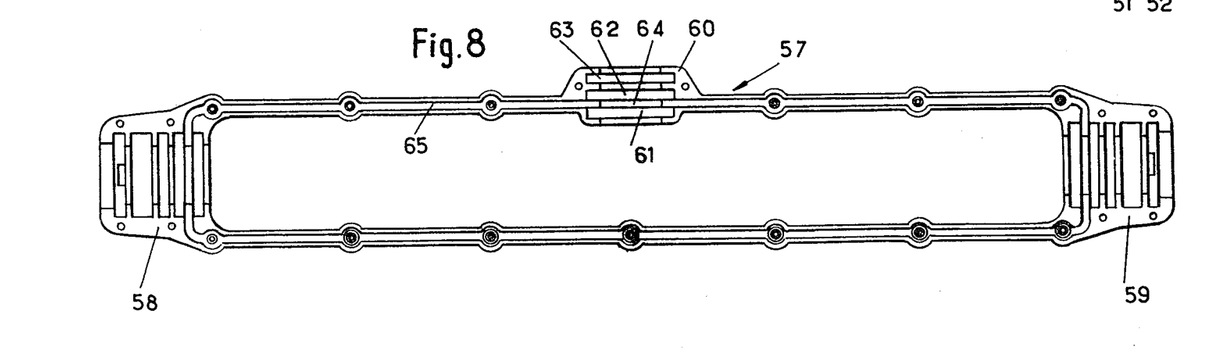
FIG. 8 is a similar view to FIG. 7, showing another variant of an embodiment.

FIG. 8 shows a half-shell 57 for a branched sleeve. This half-shell 57 is provided with two opposite end portions 58, 59 which are identical to those of the embodiment shown with reference to FIGS. 1 to 6. Branch 60 serves to take through it a third cable connected by a splice to the first two and it is provided with seatings 61, 62, 63 for anchoring jaw elements. A chamber 64 provided between seatings 61 and 62 connects with peripheral groove 65.

Also, the chamfered profile of the notches of the jaw elements 11a, 11b and the other jaws, instead of being continuous can be manufactured in several distinct parts or be replaced by teeth.

Figure 9:
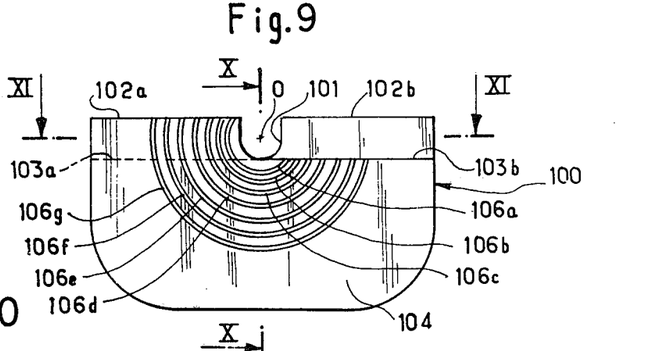
FIG. 9 is a plan view of a variant of a jaw element.

In the embodiment in FIG. 9, jaw element 100 has a notch 101 bordered by two wings 102a, 102b, each of which has a stepped joint surface 103a. 103b permitting mutual interlocking of these two wings 102a, 102b with two corresponding wings of a second jaw element. These two stepped joint surfaces 103a, 103b are orientated in the opposite direction to one another.

Each jaw element 100 is provided on each of its opposite two surfaces 104, 105 with a series of channels 106a, 106b, 106c, 106d . . . 106g extending along concentric arcs of circles between stepped joint surface 103b (or 103a) of one of the wings and the free end of the other wing. The centre 0 of these arcs of a circle is, in the working portion of the jaw elements 100, 100a (see FIG. 12), located on the axis of the sleeve 107 and the cable 108.

Channels 106a . . . 106g offer increasing radii suited to the radii of the different cables 108.

Figure 12:
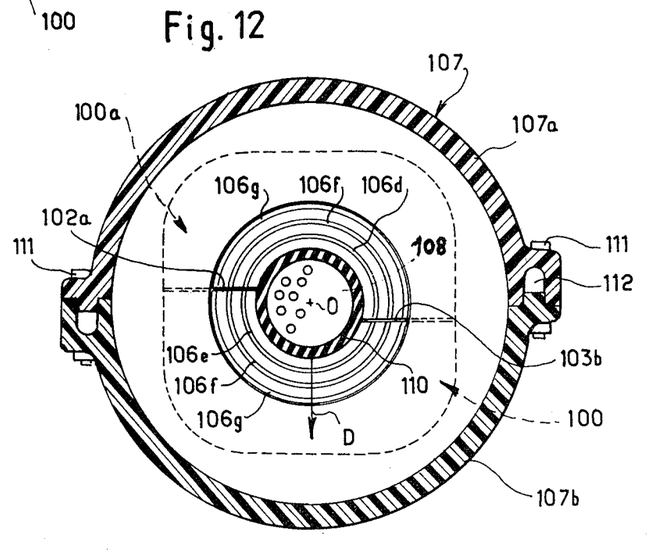
FIG. 12 is a view in transverse cross-section of a sleeve provided with a complete jaw according to FIGS. 9 to 11, applied to a cable.

In the example of FIG. 12, the cable 108 has a radius corresponding to that of channel 106d.

Figure 10:
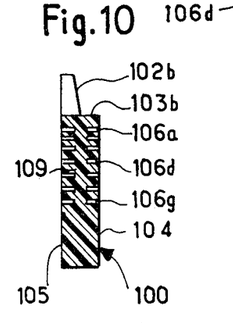
FIG. 10 is a view in cross-section along the plane X—X of FIG. 9.
Figure 11:
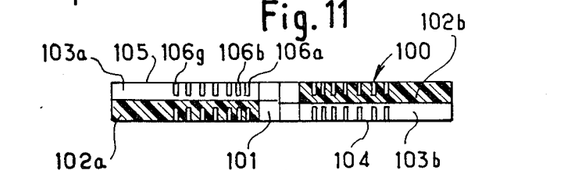
FIG. 11 is a view in cross-section along the plane XI—XI of FIG. 9.

As can be seen in FIGS. 10 and 11, the different channels 106a, 106b, . . . 106g provided on surface 104, are located with respect to these channels set in the opposite surface 105. The base of these channels 106a, . . . 107g defines a central wall 109 which can be cut by means of a knife.

In the example shown, the thickness of centre wall 109 is substantially equal to one third of the thickness of jaw element 100 or 100a.

Jaw elements 100, 100a are produced in a relatively flexible material such as thermoplastic material (for example polyurethane elastomer). In these conditions the elastic deformability of these jaw elements 100, 100a exerted in radial direction D from the centre 0 is greater than the deformability of the conduit 100 of the cable 108, which is itself usually made of a thermoplastic material.

The jaw elements 100, 100a are placed in position and anchored into sleeve 107 as described above.

Before these jaw elements 100, 100a are placed in the sleeve, they are fitted to the diameter of cable 108 by making in these elements a notch formed by a cut with a knife along the appropriate channel i.e. channel 106d in the example shown.

It is very easy to make this cut owing to the reduced thickness of the central wall 109 provided between the opposite channels 106a, . . . 106g.

After the jaw elements 100, 100a, and the cable 108 have been placed in position inside sleeve 107, halfshells 107a, 107b, are clamped against each other by means of screws 111. When they are clamped together, the jaw elements 100, 100a approach one another. Owing to the elastic and radial deformability of jaw elements 100, 100a, achieved by means of remaining concentric channels 106e, 106f, 106g, the jaw elements 100, 100a bear on conduit 110 of cable 108 perfectly assuming the irregular section of the latter.

Thus excellent watertightness is produced between the jaw elements 100, 100a and cable 108, without there being any need to use a flexible adhesive band as in the case of the previous embodiment.

One can then inject a pasty waterproofing material into the peripheral duct 112 and into the ring-shaped chamber defined between two adjoining jaws as described above.

Owing to the excellent watertightness created between the jaw elements 100, 100a and the cable 108, the waterproofing material can be injected under strong pressure, without any risk of an escape, which makes it possible to prevent any dampness from penetrating inside sleeve 107.

In the case of the waterproofing material injected into the sleeve being a polyurethane resin, adhesion between this resin and the conduit of the cable can be improved by applying beforehand to the cable an adhesive primer such as a chlorinated polyolefine diluted in xylene.

Figure 13:
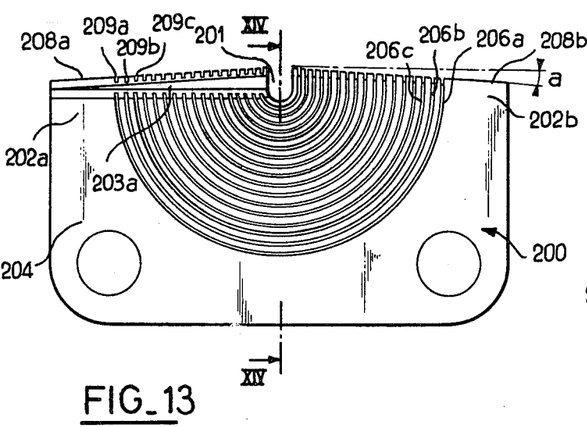
FIG. 13 is a plan view of another variant of a jaw element.
Figure 14:
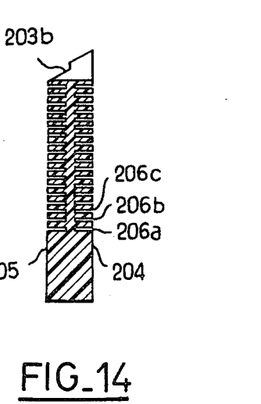
FIG. 14 is a view in cross-section along the plane XIV—XIV of FIG. 13.
Figure 15:
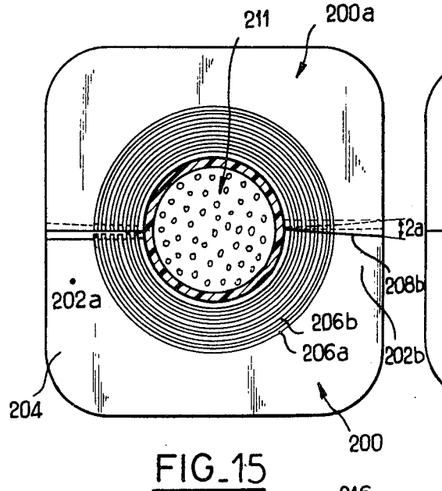
FIG. 15 is a plan view of two jaw elements according to FIGS. 13 and 14 arranged around a cable, before clamping.
Figure 16:
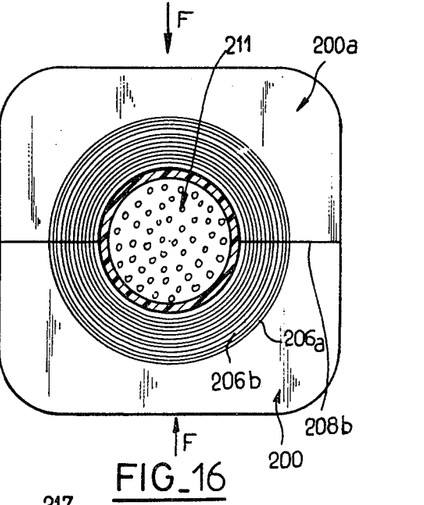
FIG. 16 is a similar view to FIG. 15, after the jaw elements have been clamped onto the cable.

In the variant of the embodient in FIGS. 13 and 14, jaw element 200 has a notch 201 bordered by two wings 202a, 202b, permitting mutual interlocking of these two wings 202a, 202b with two corresponding wings of a second jaw element 200a, as indicated in FIGS. 15 and 16.

The jaw element 200 is provided on each of its opposite surfaces 204, 205 with a series of channels 206a, 206b, 206c, etc., extending along the arcs of concentric circles between the edges of wings 202a, 202b. As in the case of the embodiment according to FIGS. 9 to 11 these channels 206a, 206b, 206c, etc., make it possible to adapt these jaw elements 200, 200a to the diameter of the cables which are intended to be protected by means of the sleeve according to the invention.

Figure 18:
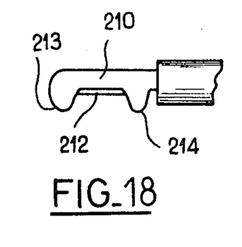
FIG. 18 is a plan view of a special blade for cutting the jaw elements.

In FIG. 13, it can be seen that the edges 208a, 208b of the wings 202a, 202b are provided with a series of notches 209a, 209b, 209c, etc., located with respect to different channels 206a, 206b, 206c, etc. These notches facilitate positioning of the blade of a knife 210 such as shown in FIG. 18, for cutting the jaw elements along the arcs of a circle defined by channels 206a,206b, etc.

Also, in FIG. 13, it can be seen that the edges 208a, 208b of wings 202a, 202b form a single angle a (2° to 5°) in relation to straight line D which is perpendicular to the median plane M of jaw element 200. The two edges 208a, 208b thus form together an obtuse angle projecting towards the outside of the element.

Thus when the two jaw elements 200, 200a are placed in position on cable 211, as indicated in FIG. 15, the adjoining edges 208a, 208b of the two jaw elements form angle 2a between them. This angle 2a disappears, owing to the elasticity of the substance, when the two jaw elements are clamped against one another according to arrows F in FIG. 16, being thus clamped together when the two half-shells of the sleeve according to the invention are screwed tight.

Experience has shown that on account of angle a it was possible to obtain a perfectly watertight elastic joint between adjoining edges 208a, 208b of the jaw elements.

The knife blade 210 shown in FIG. 18 has a section which is particularly suitable for cutting jaw elements 200, 200a. The slicing part 212 has on its edge two protuberances 213, 214. Protuberanace 213 is rounded in section so as not to injure the user's finger when this finger bears on the blade 210. Also, it can be seen from FIG. 18 that the slicing part 212 is of a length which corresponds substantially to the thickness of jaw element 200 or 200a (see also FIG. 14).

Figure 17:
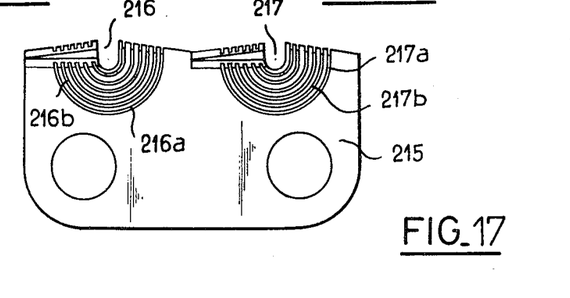

In the embodiment of FIG. 17, jaw element 215 is suitable for two cables to pass through. This element is provided for this purpose with two notches 216, 217, around which there are provided channels in the arc of a circle 216a, 216b and 217a, 217b.

We claim:

1. Sleeve for protecting the splice (4) of electric of telephone cables (2, 3) made up of two half-shells (1a, 1b) joined by their adjacent edges, around the splice, these adjacent edges being provided with a groove (7) which, when the edges are joined defines a duct (8), devices (40) being provided for injecting into this duct a pasty material creating waterproofing between the said adjacent edges, the opposite ends (9,10) of the sleeve being provided with jaws (11, 12, 13) for fastening the ends of the cables axially to the sleeve and devices for creating watertightness between these cables and these ends of the sleeve, characterised in that each of the ends (9,10) of the sleeve bears at least two detachable jaws (11,12) defining between them a chamber (18) connected with the duct (8).

2. Sleeve according to claim 1, in which the two half-shells (1a, 1b) are joined on to one another by means of a tightening screw (6) characterised in that jaws (11, 12) are of such measurements as to be able to bear on the cables (2, 3) when the connecting screws (6) of the two half-shells are tightened.

3. Sleeve according to claim 2, characterised in that each end (9,10) of the sleeve carries three identical jaws (11, 12, 13) coming to bear on the elastomer-based adhesive band (20) rolled around cables (2, 3), the duct (8) arranged between the adjoining edges of the two joined half-shells (1a,1b) emerging between the two jaws (11, 12) nearest the splice (4) of cables (2, 3).

4. Sleeve according to claim 2, the edge of each of the half-shells (1a, 1b) having holes (38) to allow connecting screws (6) to pass through, characterised in that these holes (38) emerge in groove (7) provided in the said edge, this groove being wider at the level of these holes than the diameter of the latter.

5. Sleeve according to claim 4 provided with an injection aperture and a vent connected with the duct defined by grooves in the connected edges of the two half-shells, characterised in that the vent is set between two narrow parts provided in the duct.

6. Sleeve according to claim 1, characterised in that an elastomer-based adhesive band is rolled around the ends of cables (2, 3), the two jaws (11, 12) being designed to bear on this adhesive band (20) when the half-shells (1a, 1b) are joined on to one another.

7. Sleeve according to claim 1, characterised in that the jaws (11, 12) are fastened in a detachable manner and held in position axially in seatings (14, 15) provided on the inner surface of the ends (9,10) of sleeve (1).

8. Sleeve according to claim 1, characterised in that each jaw (11,12) is provided with two jaw elements (11a, 11b), each of which has a notch (21a, 21b) which is substantially in the shape of a semi-circle with a radius adapted to that of the cable, this notch being bordered by two wings (22a, 22b, 23a, 23b) which end in stepped joint surfaces (26a, 26b, 27a, 27b) permitting interlocking of the wings of both vice components substantially in extension of one with the other, these stepped joint surfaces defining mutual bearing surfaces of the wings facing in opposite directions for each jaw element (11a, 11b).

9. Sleeve according to claim 5, characterised in that the notch (21a, 21b) of each jaw element (11a, 11b) has a chamfered edge, the crest (28a, 28b) of which is directed towards the centre of the notch.

10. Sleeve according to claim 1, characterised in that each end (9,10) of sleeve (1) is extended by a sheath (29) which is substantially cylindrical in shape and is constructed of two identical parts (29a and 29b) which are joined substantially edge to edge along two diametrical generators, the end of this sheath adjoining the end of the sleeve bearing jaw elements (32a, 32b) designed to bear on the cable (2, 3) in a similar manner to the jaw elements (11, 12, 13), each of these jaw elements (32a, 32b) being made integral with the corresponding part (29a, 29b) of the sheath (29).

11. Sleeve according to claim 10, characterised in that each part (32a, 32b) of the sheath (29) is provided near its end adjoining the end (9,10) of sleeve (1) with an elastic tab (33a, 33b) projecting outwards and bearing a ratchet nose (35a, 35b) permitting detachable anchoring of the sheath (29) in apertures (34a, 34b) provided in the end of the sleeve.

12. Sleeve according to claim 1, characterised in that each jaw element (100, 100a) is provided on each of its opposite surfaces (104, 105) with a series of channels (106a, ... 106g) extending between the wings (102) along arcs of concentric circles, the centre (0) of these arcs of circles being, in the working position of these elements in the sleeve (107), located on the axis of the latter, the radii of these channels (106a ... 106g) corresponding to the radii of the different cables (108) to be placed in the sleeve (107).

13. Sleeve according to claim 12, characterised in that the different channels (106a ... 106g) set in one of the surfaces (104, 105) of jaw elements (100, 100a) are located opposite the channels set in the other surface, the base of these channels defining a centre wall (109) which can be cut with a knife.

14. Sleeve according to claim 13, characterised in that the thickness of the said wall (109) which can be cut, is substantially equal to one third of the thickness of a jaw element (100, 100a).

15. Sleeve according to claim 12, characterised in that jaw elements (100, 100a) are constructed of a material such that the elastic deformability of these jaw elements in a direction (D) radial to the channels forming arcs of circles, is greater than the deformability of the conduit (110) of the cable (108) retained by these vice components.

16. Sleeve according to claim 12, characterised in that the edges (208a, 208b) of the wings (202a, 202b) of jaw elements form an angle (a) of some degrees with a straight line (D) which is perpendicular to a median plane M of a jaw element, the two edge of an element forming an obtuse angle projecting outwards.

17. Sleeve according to claim 16, characterised in that angle (a) is between 2° and 5°.

18. Sleeve according to claim 16, characterised in that the edges (208a, 208b) of wings (202a, 202b) are provided with a series of notches (209a, 209b) located opposite the different channels (206a, 206b, 206c ... ).

19. Sleeve according to claim 16 characterised in that jaw elements (200, 200a) are made of a thermoplastic material.

* * * * *